July 15, 1952  H. C. OLSON  2,603,397
FLUID DISPENSING VALVE
Filed Nov. 13, 1946
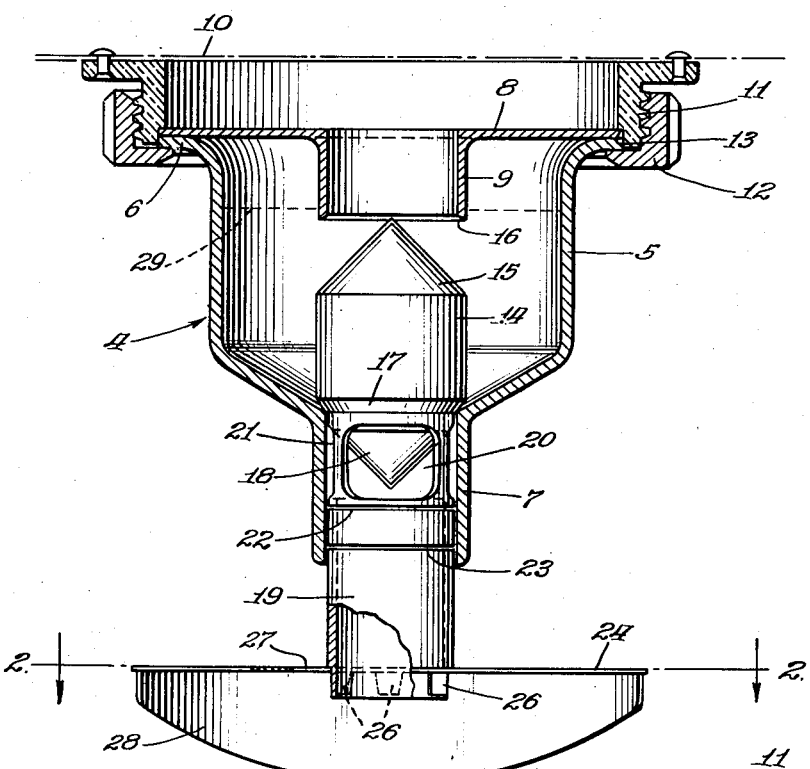
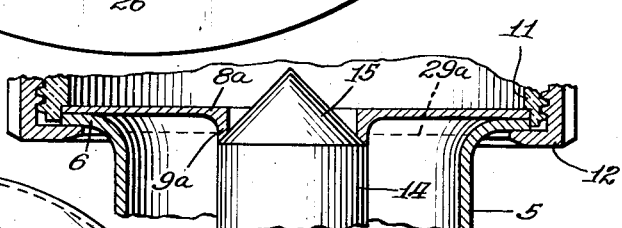
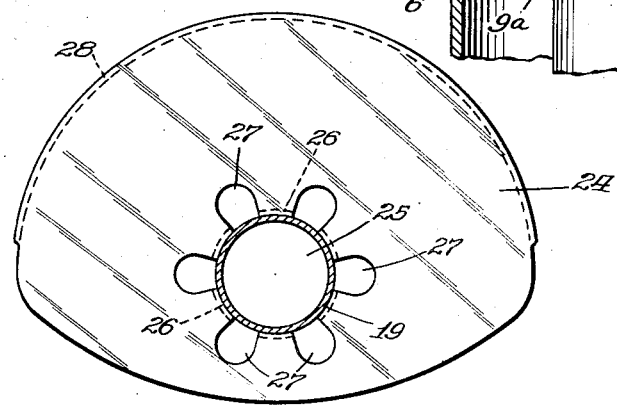
INVENTOR.
Harold C. Olson
BY Albert I. Kegan
Atty.

Patented July 15, 1952

2,603,397

UNITED STATES PATENT OFFICE 2,603,397

FLUID DISPENSING VALVE

Harold C. Olson, Stillwater, Okla., assignor to Malt-A-Plenty, Inc., Tulsa, Okla., a corporation of Oklahoma Application November 13, 1946, Serial No. 709,473

4 Claims. (Cl. 226—108)

The present invention relates to liquid dispensing apparatus and more particularly to a valve for discharging a measured quantity of liquid upon each operation of said valve.

The principal use for such a measuring valve is found in dispensing liquids for human consumption, in many cases beverages requiring careful storage and refrigeration to keep them sweet and wholesome. Dispensing apparatus, particularly for such fluid foods as milk or cream, must meet high standards of sanitation established by public health authorities. Previous measuring valves incorporating springs, sharp corners, narrow slots and tubes of small diameter are subject to condemnation by the authorities because of the difficulty of keeping the enumerated structures clean. This is particularly true of the more complicated devices since an increase in the number of working parts multiplies the number of crevices, joints and seams in which bacteria accumulate. Furthermore, the more complex the apparatus, the more labor is required in disassembling said apparatus for the thorough cleansing it should be given at frequent intervals.

Accordingly, the principal object of my invention is to provide a fluid dispensing valve for delivering measured quantities of liquid, which valve is characterized by a springless, sanitary construction and by a minimum number of working parts that can be quickly and easily disassembled and reassembled.

Another disadvantage of previous valves has been their lack of means for adjusting the quantity of fluid discharged at each operation of the valve. In the past, the volume of the measuring chamber has been predetermined in the manufacture of each valve. Consequently, if it was desired to change the portion of liquid to be dispensed, it was necessary to affix to the liquid container an entirely new valve made with a different sized measuring chamber. With my invention however, it is practicable to provide a plurality of graduated closure members, each of which are adapted to rest individually over the measuring chamber, and any one of which may be substituted quickly and easily for another thereof, in my valve. These closure members, in a manner hereinafter described, control the depth to which the measuring chamber fills with liquid from the reservoir above the chamber, and consequently the choice of a particular closure member for insertion in my valve serves to pre-select the quantity of liquid which the valve will dispense upon each operation thereof.

Thus it is another object of my invention to provide a fluid dispensing valve adapted to deliver various preselected quantities of liquid.

It is still a further object of my invention to provide a fluid dispensing valve which is of strong and durable construction, and which is relatively inexpensive to manufacture, and which furthermore does not require unusual or costly attachments to affix it to a liquid container.

The foregoing and such other advantages, objects, and capabilities as may appear herein or be pointed out as this description proceeds, or as are inherent in the present invention, are illustrated in the accompanying drawing, in which:

Figure 1 is a view taken partially in front elevation and partially in central vertical section of a preferred embodiment of my invention;

Figure 2 is a view in horizontal section taken upon the line 2—2 of Figure 1; and Figure 3 is a detail view, taken partially in front elevation and partially in central vertical section, said view illustrating the substitution in my valves of one closure disc for another having a throat tube of different length for the purpose of varying the volume of fluid dispensed from the measuring chamber.

Like reference characters are used to designate similar parts in the drawings and in the description of invention which follows:

Referring now more particularly to Figure 1, the numeral 4 designates generally a dispensing valve constructed according to my invention. The valve 4 includes a cup-like measuring chamber 5 formed with an outwardly extending annular flange 6 around its upper rim. The lower portion of the chamber 5 slopes inwardly towards a cylindrical sleeve 7 integrally formed with said chamber and depending co-axially therefrom.

The chamber 5 is capped by disc 8 resting upon the flange 6. The disc 8 is formed with a center hole therethrough and with a short, throat-like tube 9 around said hole and depending into the chamber 5. The tube 9 thus forms a passage communicating from a liquid container 10 into the chamber 5. The container 10 is constructed with a conventional, exteriorly threaded neck 11 against which the valve 4 is held by the internally flanged and threaded nut 12. The bore of the neck 11 need only be enlarged slightly as shown at the numeral 13 to seat the disc 8 and the flange 6 in order to adapt the container 10 to receive the valve 4.

Within the chamber 5 is positioned a plunger 14. This plunger 14 has a conically-shaped head 15 adapted to seat against the lower end 16 of the tube 9 in order to seal off communication therethrough from the container 10 into the chamber 5. The tube end 16 may be bevelled as shown in the drawing to form a more perfect seat for the plunger head 15. A lower portion 17 of the plunger 14 is of inverted conical shape and is adapted to seat upon the jointure of the chamber 5 and the sleeve 7 to seal off communication therebetween. The nethermost portion 18 of the inverted conical part 17 extends downwardly into the sleeve 7 to form liquid flowing downwardly from the chamber 5 into a compact stream.

The plunger 14 is maintained in proper axial alignment within the chamber 5 by a nozzle tube 19 slidably paired with the bore of the sleeve 7. This nozzle tube 19 is fixed at one end thereof to the plunger 14 about the latter's inverted conical portion 18. A number of ports are formed in the wall of said nozzle tube around said inverted conical portion 18, one of these ports being designated in the drawing by the numeral 20. To prevent sticking in the sliding action of the nozzle tube 19 within the sleeve 7, a portion 21 of the former is reduced in outside diameter. A pair of annular grooves 22 and 23 are also provided in said tube below this reduced portion. The grooves 22 and 23 act to retain lubricant (in this case the beverage or liquid being dispensed), and further act as baffles to restrict leakage of the liquid about the nozzle tube 19 during the discharge of the liquid. The nozzle tube 19 is of sufficient length to project below the end of the sleeve 7 even when the plunger 14 is fully raised against the throat tube 9.

The lower end of the nozzle tube 19 is also slightly reduced in outside diameter and projects through the three-quarter moon-shaped plate 24, best shown in Figure 2. The plate 24 has a hole 25 therethrough at the center of its lesser radii, which hole is surrounded by a number of downwardly extending spring spurs 26 pressed from the plate. These spring spurs 26 clamp the plate 24 about the reduced end of the tube 19. A plurality of recesses 27 are formed in the plate 24 extending outwardly from the hole 25 to permit resilience in the spring spurs 26. The plate 24 is also formed with a retaining flange 28 projecting downwardly from its rim of lesser radius.

The normal position of the plunger 14 is shown in Figure 1. With the plunger in this position, exit of liquid from the chamber 5 is sealed off by the seat of the inverted frusto-conical portion 17 upon the jointure of the sleeve 7 to said chamber. Meanwhile, communication is open through the throat tube 9 from the container 10 into the chamber 5, and liquid may flow freely from the former until the latter is filled to the level of the tube end 16. At said level the trapped air remaining in the chamber 5 slows the liquid flow and stops said flow altogether at the level indicated by the dotted line 29, when said air has been compressed sufficiently to balance the head of liquid in the container 10. Since the container head is only a small fraction of an atmosphere, the trapped air in the chamber 5 will be only slightly compressed and the flow of liquid from the container 10 into the chamber 5 will always stop slightly above the tube end 16. Thus, it is apparent that in my valve 4, the depth to which the chamber 5 will fill from the container 4 is almost wholly dependent upon the length of the tube 9.

Advantageously, I may provide with my valve 4 a plurality of closure discs 8, each of said discs having a throat tube 9 graduated in length from the corresponding tubes in the others of said discs. By simply unscrewing the nut 12 and lifting the disc 8 from the flange 6, any other disc 8 having a different length throat tube 9 may be inserted in the valve 4. Figure 3 illustrates the substitution of a disc 8a for disc 8 of Figure 1, the former having a throat tube 9a substantially lesser in length than the corresponding tube 9 of the latter. This substitution decreases the volume of the air which will be trapped above the filling liquid in the chamber 5 and consequently increases the quantity of liquid which will flow into said chamber and which will be delivered at each operation of the valve 4. In similar fashion, still other closure discs (not shown) with throat tubes of different lengths may be employed to replace the disc 8a for delivery of various other quantities of liquid from the valve 4.

When it is desired to dispense a quantity of liquid from the valve 4, a glass or other receptacle is pressed upwardly with the open end thereof against the plate 24. The retaining flange 28 keeps the receptacle from sliding free of the plate. Upward pressure upon the plate 24 raises the nozzle tube 19 and the plunger 14 until the conical head 15 of the latter is seated against the tube end 16. The chamber 5 is thus sealed against further liquid flow from the container 10. At the same time the ports 20 in the nozzle tube 19 come into communication with the chamber 5. The volume of liquid within the chamber 5 flows through the ports 20 against the inverted conical portion 18 and is directed thereby into a solid stream down the nozzle tube 19 and into the receptacle. When all the liquid has emptied from the chamber 5 into the receptacle, the latter is removed and the weight of the plunger 14 causes it to fall and return to normal position while the chamber 5 refills with liquid from the container 10. The valve 4 is almost immediately ready for another dispensing operation.

It should be noted that each operation of my valve stirs up the liquid in the container 10 so that a homogeneous portion of the fluid in said reservoir always refills the chamber 5. The stirring action is caused by the air displaced from the chamber 5 when said chamber is filling. This displaced air has no egress from the chamber 5 except up the tube 9; thus it bubbles up into the container 10 and substantially agitates the liquid therein each time the chamber 5 refills. This agitation is particularly advantageous for dispensing fluid milk products inasmuch as the butterfat, solids and water content thereof are kept from separating. Similarly, this automatic stirring action of my valves is useful in keeping other flavored liquids in suspension.

I prefer that the parts of my invention be formed from metal which is impervious to rust, such as, for example, nickel plated brass. If desired, the weight of the valve can be minimized by using anodized aluminum. It will be obvious to those skilled in the art, however, that other suitable materials also may be employed and that the choice of material in nowise limits the scope of my invention. However, since my valve is entirely without springs and dependent upon gravity for its operation, it is best that the plunger 14 be weighted if made from relatively light material.

The disassembly of my valves for cleaning or other purposes is very simple and may be accomplished very quickly. The plate 24 is removed from the nozzle tube 19 by merely pressing the former downward until the spring spurs 26 release their clamping grip upon the latter. The nut 12 is unscrewed from the neck 11, thereby freeing the valve 4 from the container 10. The disc 8 is lifted from the chamber 5, and the plunger 14 and nozzle tube 19 are withdrawn through the top of said chamber to complete the disassembly. If it is so desired, the valve 4 may be constructed with the nozzle tube 19 and the plunger 14 fastened together by screw means and thus the two parts could be further taken down. However, bacteria and dirt accumulating crevices are unavoidable with screw engagements and I prefer that the nozzle tube 19 and the plunger 14 be connected by a welded and finished joint.

The assembly of my valves is the reverse of the disassembling process and is equally as efficient. It is apparent that very little skill or time is required to take down said valves for cleaning and reassembly. It is further apparent that my valves are designed to meet exacting standards of sanitation, having been reduced to a simplicity of construction albeit while attaining a high degree of efficiency which is novel and inventive in the art. The novel and useful attributes of my invention are further enhanced by the capability for adjustment of my valves as to the quantities of liquid it may be desired to dispense therefrom.

Having thus decribed my invention and indicated its utility, I claim:

1. A fluid dispensing valve for discharging measured quantities of liquid, consisting of: a cup-like measuring chamber having an outwardly extending, flanged upper rim and an inwardly sloping lower portion joined to a cylindrical bearing sleeve integrally formed with and depending concentrically from said chamber, there being an opening from said chamber into said sleeve at the jointure therebetween; a disc seated upon said upper rim over said chamber, said disc having a center hole therethrough and an annular flange depending therefrom around said hole; an internally flanged nut for securing said chamber with said disc firmly seated thereon to a fluid container; a unitary, cylindrical plunger vertically reciprocable within said chamber, said plunger having a conically formed top adapted to seat against said annular flange, an inverted frusto-conical intermediate portion adapted alternatively to seat over said opening, and an inverted conical nethermost portion for directing liquid flowing from said chamber into a downward stream; a cylindrical nozzle, slidably paired with the bore of said sleeve, depending from said plunger and terminating substantially below said sleeve in a portion of slightly reduced outside diameter, the wall of said nozzle adjacent said plunger having a plurality of ports therein; and a three-quarter moon-shaped plate, with a flange extending downwardly from its rim of lesser radius, removably journaled upon said reduced portion of said nozzle by means of an annular plurality of downwardly projecting spring spurs pressed from said plate about a hole therein concentric with said rim.

2. In combination with a fluid dispensing valve as described in claim 1, a plurality of discs adapted to rest individually upon said upper rim over said chamber, each of said discs having a center hole therethrough and an annular flange depending therefrom around said hole graduated in length from the corresponding parts in the others of said discs, whereby the substitution of one of said discs for another thereof in said valve changes the volume of air which may be displaced by liquid in said measuring chamber and permits adjustment of the quantity of liquid delivered by each operation of the valve.

3. A fluid dispensing device for discharging beverages from a container, comprising a measuring chamber, a sleeve integrally formed with and depending from said measuring chamber, said chamber and said sleeve forming a smooth, uninterrupted flow passageway for said beverages; a plunger including a tube slidably paired with said sleeve, and an inverted conical shaped valve member attached to the upper end of said tube and adapted to seat against the shoulder formed by the intersection of said sleeve and said chamber, said tube having one or more discharge ports therein adjacent the upper end thereof, the tip of said conical shaped valve member extending below the upper limit of said discharge ports, that portion of said tube containing said discharge ports having a slightly reduced outside diameter; and means for moving said plunger upwardly to unseat said valve member from said shoulder and uncover said discharge ports.

4. A fluid dispensing device for discharging beverages from a container comprising a measuring chamber having a flanged upper rim, a sleeve integrally formed with and depending from the measuring chamber, said chamber and sleeve forming a smooth uninterrupted flow passageway for said beverages; a disc removably seated upon said flanged upper rim, said disc having a center hole and a tubular extension depending from the body of the disc, around said hole, into the measuring chamber, said disc being exchangeable for similar discs with tubular extensions of different lengths, whereby the quantity of liquids delivered by each operation of the valve can be adjusted; a plunger including a tube slidably paired with said sleeve and an inverted conical shaped valve member attached to the upper end of said tube and adapted to seat against the shoulder formed by the intersection of said sleeve and said chamber, said sleeve having one or more discharge ports therein adjacent the upper end thereof to allow a flow of beverage from the measuring chamber into the tube and downwardly through the same when the plunger, tube and valve member are raised; and means for raising said plunger, tube and valve member to allow such flow from the measuring chamber.

HAROLD C. OLSON.

REFERENCES CITED

The following references are of record in the file of this patent:

UNITED STATES PATENTS

| Number | Name | Date |
| --- | --- | --- |
| 295,009 | Hogan | Mar. 11, 1884 |
| 824,468 | Calley | June 26, 1906 |
| 852,074 | Morrison | Apr. 30, 1907 |
| 2,322,912 | Berman | June 29, 1943 |
| 2,466,899 | Kincaid | Apr. 12, 1949 |

FOREIGN PATENTS

| Number | Country | Date |
| --- | --- | --- |
| 525,631 | Great Britain | Sept. 2, 1940 |
| 567,957 | Great Britain | Mar. 9, 1945 |